(12) United States Patent
Miesak (10) Patent No.: US 6,596,967 B2
(45) Date of Patent: Jul. 22, 2003

(54) LASER BASED ETCHING DEVICE

(76) Inventor: Edward Miesak, 222 E. Concord St., Orlando, FL (US) 32801

(*) Notice: Subject to any disclaimer, the term of this patent is extended or adjusted under 35 U.S.C. 154(b) by 191 days.

(21) Appl. No.: 09/781,934

(22) Filed: Feb. 12, 2001

(65) Prior Publication Data

US 2002/0046994 A1 Apr. 25, 2002

Related U.S. Application Data

(60) Provisional application No. 60/243,020, filed on Oct. 24, 2000.

(51) Int. Cl.$^7$ ............................................. B23K 26/20
(52) U.S. Cl. ................................................. 219/121.69
(58) Field of Search .................... 219/121.6, 121.61, 219/121.68, 121.69, 121.78, 121.82, 121.85

(56) References Cited

U.S. PATENT DOCUMENTS

| | | | |
|---|---|---|---|
| 4,092,518 A | * | 5/1978 | Merard |
| 5,575,936 A | | 11/1996 | Goldfarb |
| 6,333,486 B1 | * | 12/2001 | Troitski |
| 6,426,480 B1 | * | 7/2002 | Troitski |

* cited by examiner

Primary Examiner—Samuel M. Heinrich
(74) Attorney, Agent, or Firm—Chernoff Vilhauer McClung & Stenzel, LLP (57) ABSTRACT

A system modifies the optical properties of an object by using a light beam from a light source that is focused at a first focal point within the object to optically change a first location within the object at the first focal point. The light beam is focused at a second focal point within the object to optically change a second location within the object at the second focal point. The light beam is focused at a third focal point within the object to optically change a third location within the object at the third focal point The object is moved relative to the light beam while creating the optical change at the second location.

75 Claims, 4 Drawing Sheets

LASER BASED ETCHING DEVICE

This application claims benefit of provisional No. 60/243,020, filed Oct. 24, 2000.

BACKGROUND OF THE INVENTION

The present invention relates to a system for creating an image within an object.

Goldfarb, U.S. Pat. No. 5,575,936, discloses a system for etching an image within a solid article that includes the steps of focusing a laser to a focal point within the article and positioning the article with respect to the focal point. The laser is then fired so that a local disruption occurs within the article. The process is repeated to form the image within the article. Each local disruption creates a small localized but visible fracture., e.g. a three dimensional pixel. These pixels are combined together to create a three-dimensional (or two-dimensional) object inside the optical material. The pixels appear generally opaque because they scatter the light incident therein. In room light or sunlight they look white. In colored light they appear to be the same color as the light incident thereon. It is likewise generally known that a smaller amount of power will create a smaller local disruption while a larger amount of power will create a larger local disruption. However, the resulting size of the disruption is not easily controlled because the resulting catastrophic optical damage is not readily controllable. Unfortunately, the system taught by Goldfarb results in poor results when used with irregular shaped objects or spherical objects. In addition, the time it takes to etch an image is limited by the speed of the positioning system to position the article at the desired location, stop the positioning system, fire the laser to create the local disruption, and then reposition the positioning system at the next desired location. With thousands of pixels (local disruptions) necessary for many images it takes considerable time to create each finished article.

What is desired, therefore, is a system that may be used to create a set of dislocations within an object in a quick manner with high image quality.

DETAILED DESCRIPTION OF THE PREFERRED EMBODIMENT

Figure 1:
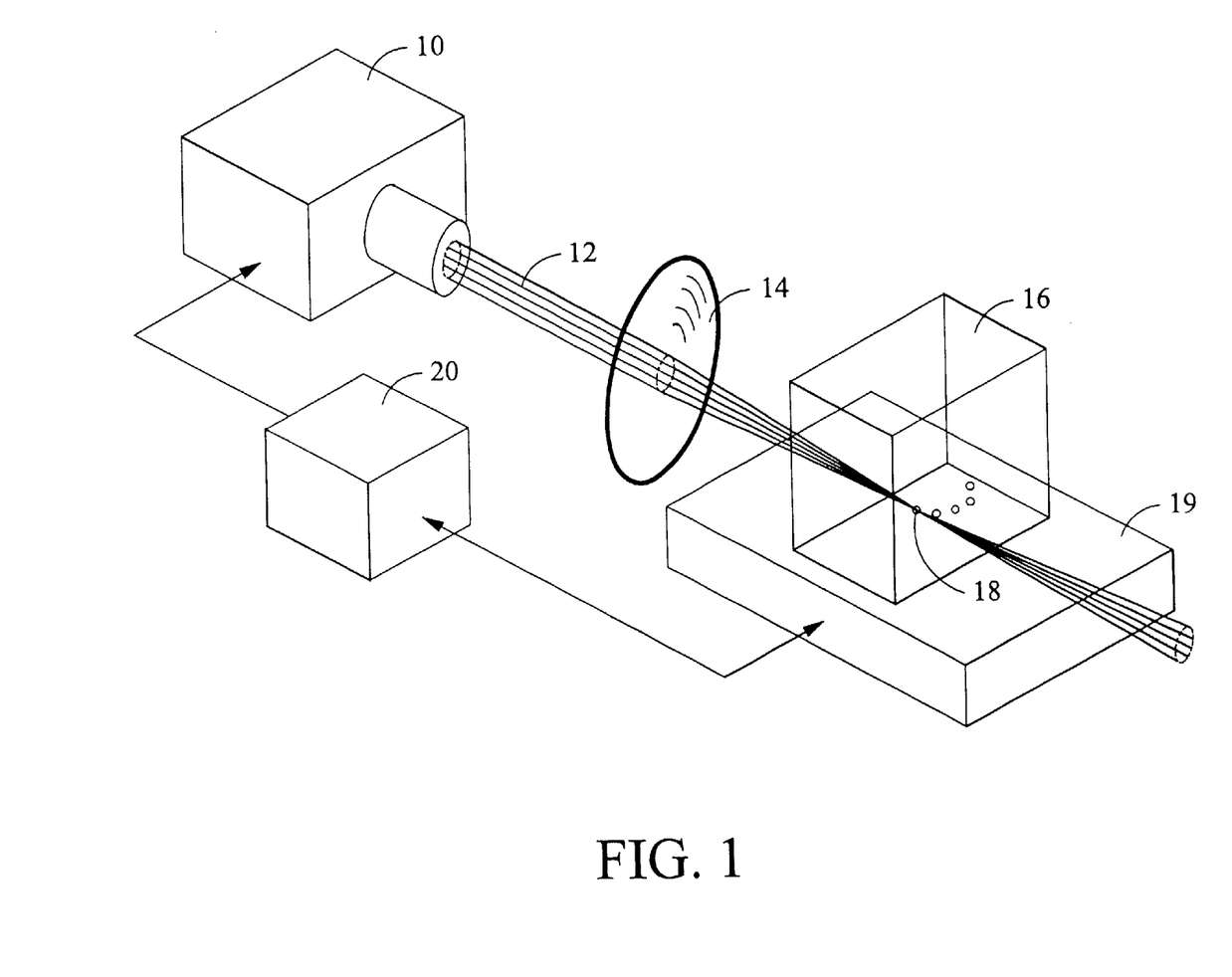
FIG. 1 is an exemplary embodiment of a laser based etching system, including a computer.

Referring to FIG. 1 a laser 10 projects a laser beam 12 towards a focusing lens 14. It is to be understood that the laser 10 may alternatively be any light beam (coherent or non-coherent) and is preferably coherent (or substantially coherent) electromagnetic radiation. The laser 10 may provide a pulsed output of regular or irregular pulses, or provide continuous output together with a shuttering device to fully or partially interrupt the resulting beam. The beam 12 is focused to a focal point 18 within a solid object 16. A movable platform 19, or any other supporting structure for the object 16, supports and positions the object 16 to position the focal point 18 at the desired location. A computer 20 or other controller is electrically connected to the laser 10 and/or the platform 19 to move the object 16 so that the focal point 18 is located at a particular point (or region) within the object 16. Alternatively, the laser 10 may be moved with the object 16 being maintained stationary, if desired. Further, both the laser 10 and the object 16 may be moved, if desired, or optical components may be used to change or otherwise select the position of the focal point 18 within the object 16. In other words, what is desired is positioning of the focal point 18 within the object 16 by any suitable mechanism. The computer 20 also directs the laser 10 to generate a pulsed laser beam 12 (in the cased of a pulsed laser beam) which, after preferably passing through the focusing lens 14, interacts with the material of the object 16 at the focal point 18 to create a localized disturbance in the structure of the object 16.

The object 16 may be made of any transparent or translucent material, such as for example, clear glass, colored glass, optical crystals, or organic glass. Glass is generally classified as an amorphous solid. In the case of a transparent block of glass, the internal structure allows light rays to pass directly through. The intensity of the radiation at the focal point 18, when sufficient, disturbs or locally destructs the glass in the vicinity of the focal point 18. This is achieved, for example, by heating and/or melting and/or expanding the glass in the vicinity of the focal point to cause cracking or otherwise a disturbance. The surface and surrounding area of the object remain substantially unaffected.

The local disruptions create imperfections within the object 16 with a lower translucence than the surrounding areas. As a result, the region of location destruction appears as a foreign object encased within the object. The characteristics of the local disruptions, e.g., the size of the point, can be controlled by adjusting the intensity and/or length of the laser emission. A series of local disruptions can be coordinated to form two-dimensional and three-dimensional images within solid objects. The characteristics of the laser should be selected so that the laser emission disrupts, melts, or otherwise causes micro fractures in the object (article) in the vicinity of the focal point without substantially affecting the area surrounding the focal point. In general, the beam 12 enters the lens 14 with the rays along parallel lines (or substantially so) and having the same frequency. The beam may then be focused into a spot approximately as wide as the wavelength of the rays, or to any size desired. Thus, intense energy may be focused into a relatively small region.

Figure 2:
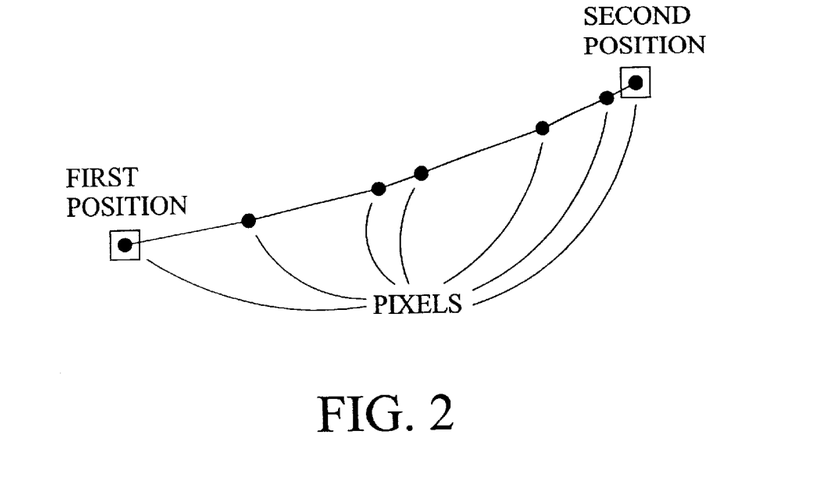
FIG. 2 is a graph of the pixel positions within an object created when moving the object from a first position to a second position.

The present inventor considered the generally accepted technique of positioning the object relative to the laser, stopping the relative movement of the object thereafter pulsing the laser to create a local disruption, then repositioning the object relative to the laser for the next local disruption. The present inventor then came to the realization that the duration of a laser pulse or a series of pulses, having sufficient energy contained therein, may be relatively short compared to the time necessary to move from position to position for the focal point to create a disruption within the object. In addition, the time necessary to create such a sufficient laser pulse or series of pulses is very fast in relation to the movement of the object, under normal circumstances. Therefore, accurate timing of spaced apart laser pulses or series of pulses may be performed with relative confidence in relation to the movement of the object, even while the object is still moving. Accordingly, referring to FIG. 2 while the object is being moved from a first position to a second position the laser may be pulsed, or otherwise providing pulsed light to the object, at times selected to coincide with regions where a localized disruption is desired. Many pixels may be created between the first and second position. In addition, this readily permits the spacing of pixels to be at any position along the path of the object 16. Therefore, during the creation of the localized disruptions the positioners do not have to repeatedly stop and start thereby increasing the rate at which the pixels may be created and thus decreasing the time necessary to create hundreds, if not thousands, of individual localized disruptions.

Figure 3:
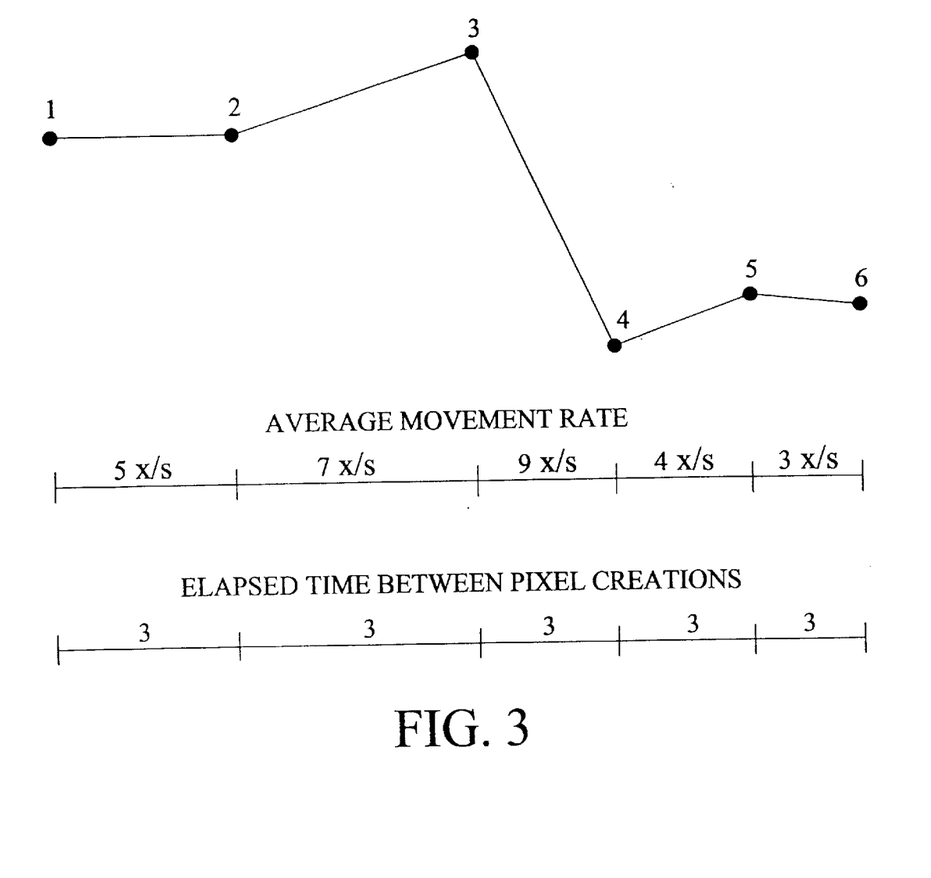
FIG. 3 is a graph of the pixel positions within an object and the relative velocities of the positioning system.

While such continuous movement of the positioning stage is beneficial, the present inventor came to the realization that not all of the resulting pixels are uniform in character. In addition, after observation of the pixels the present inventor was astonished to observe that the non-uniformity is not merely random, but the non-uniformity tends to be grouped with some regions being generally uniform in character while other regions are generally non-uniform in character. After further examination of the uniform versus non-uniform regions, the present inventor observed that the uniform regions are generally located in regions where the pixels are evenly spaced apart and the non-uniform regions are generally located in regions where the pixels are not evenly spaced apart. While such properties may be the result of the structure of the material itself, the present inventor determined that the source of the non-uniformity is the result of the laser based system. Maintaining the movement of the positioning stage and pulsing the laser at the appropriate times creates disruptions at the desired locations, but the laser itself is operating at a non-constant repetition (pulse) rate. The non-constant pulse rate prevents the laser from creating a thermal equilibrium and tends to decrease the lifetime of the laser. Referring to FIG. 3, after determining the source of the non-uniform localized disruptions, the present inventor modified the positioning stage and associated computer to accelerate the positioning stage at an appropriate speed in relation to the spacing between the current and next adjacent pixel to be created to maintain a constant, or substantially constant, laser repetition rate. When the desired position of a pixel is reached, the laser is fired such that the pixel is created at the desired location. The positioning stage may modify its speed, direction, and acceleration, as necessary, to position the next pixel such that the laser may be fired at a constant (or substantially constant) repetition rate. This is especially useful when the spacing between successive pixels to be created is non-uniform. In this manner, the desired pixel locations are created in a constant (or near constant) rate. With a constant rate (or substantially constant rate) of pixel creation the laser will tend to operate at a thermal equilibrium thereby providing much more constant energy for each pulse which therefore creates more uniform pixels. Also, a laser operating at or near thermal equilibrium has a much higher quality beam. In addition, the lifetime of the laser will tend to be increased. Preferably the laser is operated at or near its maximum repetition rate to decrease the time necessary to manufacture a device.

There may be regions of the image where the positioning mechanism of the positioning stage will not be sufficient to permit pixel creation at a uniform rate, such as pixels spaced far apart. In this event, preferably the laser repetition rate is temporarily slowed to permit constant (or substantially constant) pixel rate creation. In regions of dense pixel locations the laser repetition rate may be increased because little movement is necessary, resulting in a decrease in the time necessary to create an object. In either event, the rate of pixel generation and hence the thermal equilibrium of the laser, will be substantially constant for significant regions of the object.

Unfortunately, slowing the laser repetition rate may result in a decrease in the thermal equilibrium of the laser itself. An alternative solution to decreasing the laser repetition rate is to change the operation of the laser itself. In order to fire a laser normally two events need to be triggered, namely, a flash lamp and a Q switch. During normal operation first the lamp is fired, then after a specific time interval, the Q switch is fired. In typical laser systems both signals are provided by the accompanying hardware and software, if any, provided with the laser to ensure proper operation of the laser itself. Accordingly, it is typical that each signal triggering the lamp has an accompanying signal for triggering the Q switch, albeit at a later time. The present inventor came to the realization that by controlling whether each of these signals is provided to the laser, the laser firing rate may be changed while still maintaining an improved thermal equilibrium. In some cases, a signal may be provided to the laser to trigger the lamp while a subsequent signal for triggering the Q switch is not provided. In this manner, multiple signals for triggering the lamp may be provided without an intervening signal for triggering the Q switch. When a pattern being etched has a long distance to travel with no (or a limited number of) pixels being present, the lamp may still be fired multiple times but the Q switch is not fired.

With the decoupling of the triggers for the lamp and the Q switch the present inventor came to the further realization that the output energy of each pulse may be modified, as desired, by varying the time delay of the Q switch after the flash lamp fires. An optimum delay will produce an output pulse of maximum energy. A longer delay or a shorter delay will produce pulses having a reduced amount of energy. By varying the delay for triggering the Q switch pulses of different energy levels may be produced, which in turn may be used to etch pixels of various sizes in the material. For example, using pixels of different sizes may be employed to create the impression of a gray scale. Gray scale may likewise be achieved by modification of the pixel density of the image. Closely spaced pixels in an area are denser to the eye ad thus more easily seen. Sparely spaced pixels make an area that is are difficult to see, and hence appear lighter.

Depending on the energy levels it may be difficult to achieve sufficiently dark pixels without excessively damaging the glass. To overcome this limitation the present inventor determined that a layered approach of spacing multiple pixels, generally in line with the anticipated line of sight of the viewer, provides a more controlled technique for achieving accurate gray scale. This technique may be combined with varying the energy applied to achieve superior gray scale results.

The flash lamp is used to excite the gain medium of the laser. Alternatively, a diode pump, or any other known technique, may be used to excite the gain medium. The Q switch is used to produce a short laser pulse output in time. Alternatively, any other switching technique may be used to selectively produce an output laser pulse, preferably having high peak power, such as on the order of Megawatts. Normally, the pulse or CW energy is sufficient to create an optical defect, melt the material, or create an interference.

It is to be understood that a light beam from a light source may be in any form, such as a pulse of light or continuous output.

When a system, as previously described, is constructed the present inventor noticed that the position of the pulses sometimes varied in a unpredictable manner. After further examination the present inventor noticed that the unpredictable manner is predictable in the sense that the pixel positions are sometimes offset in the direction of the movement of the positioner 18. In other words, the laser periodically fires late. While attempting to compensate for the unpredictability by adjusting the timing of the laser and/or the speed of the positioner, this merely resulted in the pixel positions being offset in both directions along the movement of the positioner 18. In other words, the laser periodically fires late and early relative to the desired position of the object. In an attempt to solve this unpredictability the present inventor tried to correlate the timing of pixel creation to some event causing their misplacement. Traditionally, the system for controlling the positioner and the laser is connected directly to a port on the computer 20. When the positioner has properly positioned the object (or about to be in the proper position) the computer 20 transmits a signal to the laser 10 indicating that a pulse should be provided. In an attempt to determine the source of the timing errors, the present inventor observed the timing of the signals from the computer 20 and noticed that they were not always transmitted at the appropriate moment. With this timing issue discrepancy determined to be within the computer 20, present inventor considered an unlikely source of the timing errors, namely, the computer 20 itself. In the current age of multi-tasking computers with multiple programs being operated simultaneously, it turns out that the sending of pulses may be somewhat delayed by other computer operations, such as screen savers, internal maintenance, disk access, other programs, etc.

Figure 4:
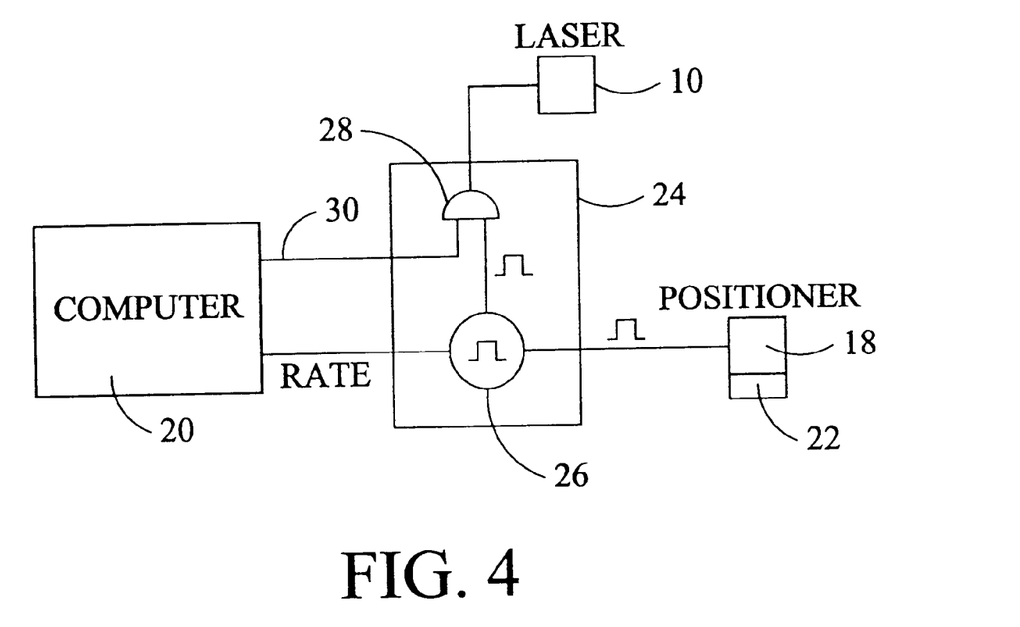
FIG. 4 is an exemplary embodiment of the computer of FIG. 1 and an external timing circuit.

Referring to FIG. 4, to overcome the limitations of the computer 20, the preferred system includes an external timing circuit 24 connected to the computer 20. The positioner 18 preferably includes stepper motors 22 which determine the position of the object 16. The timing circuit 24 includes a square wave oscillator 26 connected to the stepper motor 22, where the number of pulses provided to the stepper motor 22 directly corresponds to the position of the positioner 18 and the object 16. Accordingly, the computer 20 indicates to the oscillator 26 the rate of the pulses so that the positioner may be properly positioned for the next pulse while attempting to maintain substantially constant pulse rate. The computer 20 may count the number of pulses provided to the stepper motors 22, which is merely a matter of tracking the high and low states of the oscillator. By simply counting the number of pulses, which does not require accurate timing to determine changes in the high-low state, the computer 20 can accurately determine the position of the positioner 18. With the position of the positioner 18 known together with the desired position of the pixel, the computer 20 changes the state on the input 30 to an AND gate 28 to high (logical 1) during the half cycle prior (one half step of the stepper motor) to the desired position. The timing necessary by the computer 20 is merely to change the state on input 30 during a half cycle, which even if the computer is performing other functions, is relatively easy to accomplish. When the oscillator 26 changes state to high (logical 1) the output of the AND gate 28 provides a signal to the laser 10 at the proper position. In this manner, the partial decoupling of the computer 22 with the timing circuit 24 provides more accurate pixel control creation. Moreover, high accuracy is achieved by virtue of the inherent speed of transition of the AND gate 28 and the sharp transition edges of the oscillator. It will be noted that the computer 20 does not determine the exact placement of the pixel. In addition, the computer 20 does not control the position of the positioners 18 directly, but instead, through an external timing circuit 24 that is not dependent upon the other functions that the computer 20 may be performing. Accordingly, the computer 20 may perform its background functions without disturbing the speed of the stepper motors and the repetition rate of the laser. The computer 20 merely needs to be fast enough to read and write to a port and perform minimal functions between laser pulses. In addition, the external timing circuit may include memory and controlling circuitry to position the object and fire the laser, with the positions of the pixels being stored in a buffer, so that the computer 20 merely needs to provide the data periodically to the buffer.

Figure 5:
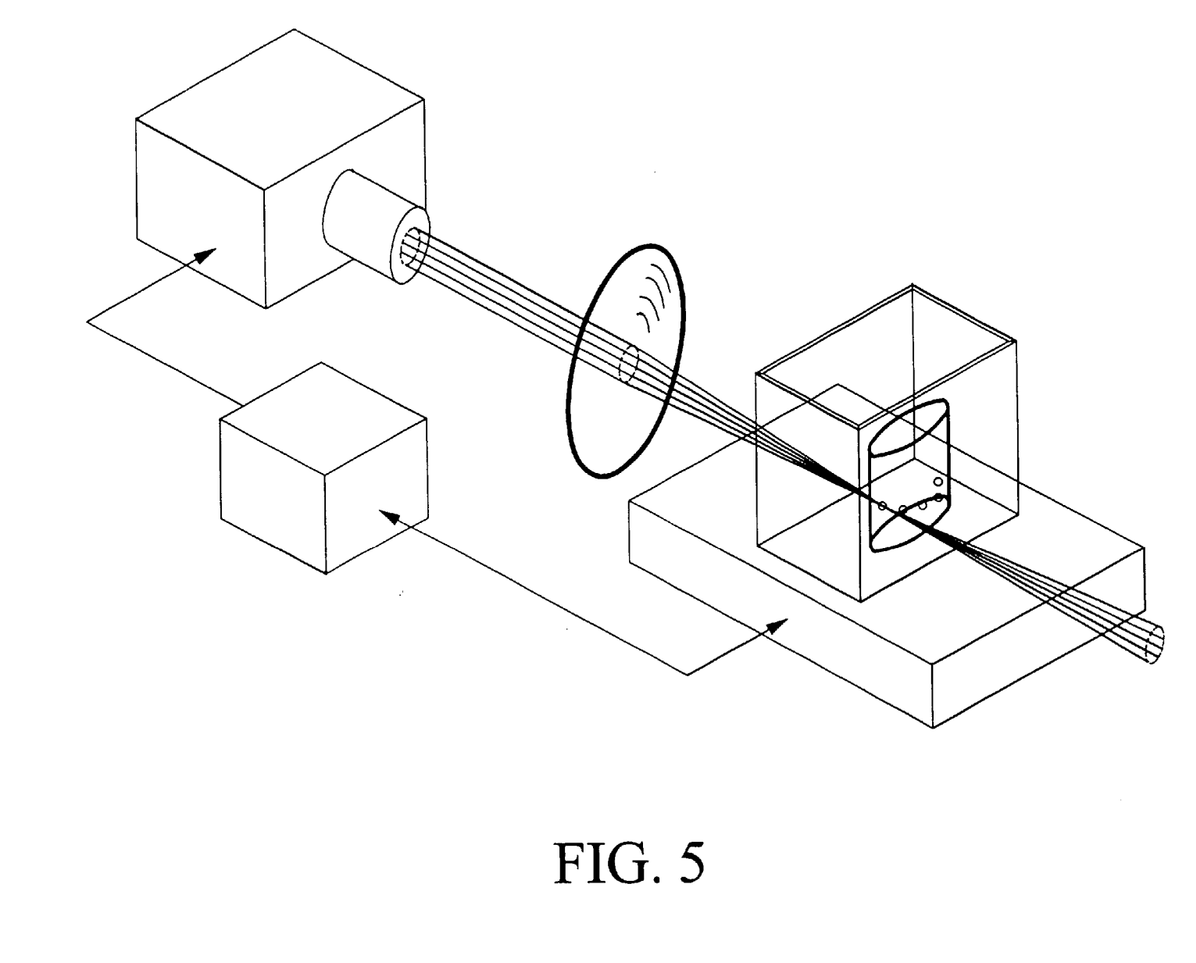
FIG. 5 is an exemplary embodiment of an object in a container including refractive index matching material.

While attempting to engrave within non-rectangular objects, where the beam incident thereon is not perpendicular thereto, the focal point tends to shift depending upon the angle of incidence. When engraving an image within an object having a curved irregular surface, the angle of incidence for different points varies from point to point, thereby shifting the location of the focal point from that which it would have been had the angle of incidence been perpendicular. In addition, poorly polished glass (or plastic) likewise tends to scatter the incident light thereon resulting in a poorly focused beam. This shifting or otherwise disturbing the focusing of the beam has been previously unaccounted for in system design. One potential technique to properly locate pixels within an object is to take into account the surface profile of the object together with the index of refraction of the material to determine where the laser should be focused to position the pixel where desired. Unfortunately, modeling of the surface of each different potential object, within which an image may be desired, is a burdensome task requiring significant computations. After further thought, the present inventor determined that an improved technique involves the optical removal of the irregular curved surface. Referring to FIG. 5, to optically remove the irregular curved surface or poorly polished surface, the object is submersed in a liquid material with an index of refraction substantially matching that of the object. The exterior surface of the container holding the object and index matching liquid material should likewise have the same index of refraction. Preferably the container has a polished flat surface perpendicularly oriented to the laser beam. The combination of the container and fluid appear to the beam to be the same as the object itself and accordingly the beam may be focused accurately within the object. In addition, the exterior container will not be damaged because the beam is focused in the interior. Once the engraving process is completed the object is removed from the container.

Contrary to traditional wisdom, under certain conditions, a focused laser beam has relatively little distortion when entering glass spheres (or curved portions of objects) of relatively large diameters. Large diameters may be on the order of about 1½ inches or greater in diameter. In order to minimize the distortion of the beam incident on the sphere, the beam is directed through (or substantially through) the center of the sphere. Therefore, the beam is oriented normal (or substantially normal) to the surface of the sphere. With the beam being normal (or substantially normal) to the spherical surface, the beam may be adequately focused at a point sufficient to create a pixel. To etch a two-dimensional or three-dimensional image within the sphere, the sphere is rotated about its center point and moved closer to and farther away from the laser. Alternatively, the position of the lens may likewise be modified to change the radial position of the pixel. At each point, the beam remains normal to the surface. If desired, spherical coordinates (two orthogonal axes of rotation and a radius in line with the laser beam, all of which intersect the center of the sphere) may be used to position the object. The actual depth of the pixel is a function of the position of the object, the focal length of the lens, the index of refraction of the object, and the diameter of the object. In this manner, the entire sphere may be etched, as desired. Preferably, the depth of the pixel within the sphere is controlled by moving the sphere relative to the lens or the lens relative to the sphere.

One desirable, though thought unobtainable objective, is to create multicolored pixels on the surface of and within the object itself. However, without actually injecting dye into the object itself this is a problematic objective. To solve this seemingly improbable objective, initially the present inventor noted that some glass (or other materials) can be modified by particular types of laser beams to change their optical properties. For example, glass doped with silver can be induced to change its index of refraction when irradiated by ultra-violet light. This change in the index of refraction may be made permanent by heating the glass to a sufficient temperature and holding it there for a sufficient length of time. Moreover, the present inventor determined that if the irradiating beam contains spatial features then these features may be "mapped" onto or within the glass as a different index of refraction. To create a spatial feature within (or on) the glass, for example, a beam may be split into two beams using a partially reflecting mirror and then the resulting two beams may be directed onto the same spot (or region) with an angle between the two beams. The interference pattern mapped into (or on) the glass is a function of the wavelength of the light and the angle between the beams. Accordingly, the portion of the interference pattern that contains light will result in a change in the index of refraction of the object, while that portion of the interference pattern that does not contain light will result in no change in the index of refraction of the object. The interference pattern in most instances will take the form of parallel lines.

The spacing of the parallel lines determines how light incident on the set of parallel lines behaves. Generally speaking the set of parallel lines will disperse the light, and as such create a rainbow of colored light. Moreover, these recorded interference patterns are a source of colored light when multicolored light, such as white light, strikes it. In addition, these interference patterns may be made small and used as image pixels. A further highly beneficial result is that the interference based pixels are created by a non-destructive process which is not prone to catastrophic damage to the object if the pixels are spaced too closely. Also, the interference patterns may be positioned in an overlapping manner, if desired, thereby creating separate but overlapping pixels which is not possible with the etching technique using optical damage as a pixel.

An additional feature that is desirable is multi-colored pixels within the same object. After consideration of this objective, the present inventor came to the realization that by adjusting the angle of the combing beams the resulting color of the pixel when illuminated by light may be selectively controlled. This technique may result in a colored pattern within the object itself. Preferably computer controlled equipment is used to selectively create the desired pixel patterns with the desired colors.

The creation of pixels by etching or by the effects of parallel lines results in pixels that are either "on" or "off", thus being present or not present. The resulting image is composed of disruptions that are effectively the same size, except for perhaps the size of the disruption or parallel lines. The "on" and "off" nature of the pixels limits the replication quality of the image to less than would be achievable if the darkness of the individual pixels could be selected. While the creation of grey scale pixels with an etching process seems contradictory, the present inventor again considered this improbable objective. Initially the present inventor considered pulsed lasers, such as femtosecond lasers, which have an output pulse of very high intensity, such as giga-watts or even terra-watts while still maintaining high intensity. The low pulse energy is primarily due to the short pulse duration, such as on the order of less than 100 femtoseconds in duration. Because of this property of high intensity with low energy, the beam from such a light source can be focused inside an object to produce a very wide spectral bandwidth of light without damaging the object itself. This broad band light is generated through a process of self phase modulation and cross phase modulation inside the optical material (e.g. glass) itself. By selecting an object, such as glass, with a chemical composition suitable for absorbing a part of the spectral bandwidth, such as the ultraviolet portion, a portion of this spectral bandwidth may be absorbed by the object. This portion of the spectral bandwidth is absorbed resulting in "color centers" being generated which cause the glass to turn dark in the vicinity of the focused laser beam. This darkening is localized and readily visible as a pixel. The optical density of a particular color center (darkness of the pixel) is generally linearly related to the intensity of the laser pulse. Since the pulse width is preferably held constant, this darkening effect may be controlled by the pulse energy. The pulse energy is preferably controlled by an optical attenuator. Image pixels of controllable darkness can thus be generated by controlling an optical attenuator during the laser etching process.

By combining all of the aforementioned techniques a far superior laser etching system is created. Various types of image pixels may be used to the maximum effect in a single image. Colored pixels can be used to "paint" a sky with rainbows while damage spots can be used to put "stars" in the sky. Gray scale pixels can be used to put shadows under objects. All this can be done in any shaped glass (spherical, cylindrical, cubic, conic, irregular, etc.) at maximum throughput speeds. This final result is an etching process that is merely limited the by imagination of the person controlling the etching process.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of modifying the optical properties of an object comprising:
   (a) focusing a light beam from a light source at a first focal point within said object to optically change a first location within said object at said first focal point;
   (b) focusing said light beam from said light source at a second focal point within said object to optically change a second location within said object at said second focal point;
   (c) focusing said light beam from said light source at a third focal point within said object to optically change a third location within said object at said third focal point; and (d) moving said object relative to said light beam while creating said optical change at said second location.

2. The method of claim 1 wherein said light source provides said light beam of substantially coherent electromagnetic radiation.

3. The method of claim 2 wherein said light source provides a pulse of light focused at said second focal point.

4. The method of claim 3 wherein said light source is a pulsed laser.

5. The method of claim 1 wherein said object is moved using a stepper motor.

6. The method of claim 1 wherein said object is continuously moved from said first location to said second location to said third location using a stepper motor.

7. The method of claim 1 wherein said light beam does not create visibly perceptible optical changes within said object during the time between the creation of said optical change at said first location and the creation of said optical change at said third location except for the creation of said optical change at said second location.

8. The method of claim 1 wherein a preselected image is created within said object.

9. The method of claim 1 wherein the spacing between said first location and said second location is different than the spacing between said second location and said third location, while the time elapsed between the creation of said optical change at said first location and said optical change at said second location is substantially the same as the time elapsed between the creation of said optical change at said second location and said optical change at said third location.

10. The method of claim 9 wherein the relative times elapsed are equal.

11. The method of claim 9 wherein said light source is a pulsed laser with a substantially constant pulse rate.

12. The method of claim 9 wherein said object is positioned with a positioning stage that is adjusted with non-uniform acceleration between the creation of said first position, said second position, and said third position, when said first, second, and third positions are linearly aligned.

13. The method of claim 9 wherein said object is positioned with a positioning stage that is adjusted with non-uniform speed between the creation of said first position, said second position, and said third position, when said first, second, and third positions are linearly aligned.

14. The method of claim 13 wherein said light source is a laser operating at a thermal equilibrium.

15. The method of claim 13 wherein said light source is a pulsed laser providing substantially constant energy for each pulse.

16. The method of claim 9 further comprising:
(a) focusing said light beam from said light source at a fourth focal point within said object to optically change a fourth location within said object at said first focal point;
(b) focusing said light beam from said light source at a fifth focal point within said object to optically change a fifth location within said object at said fifth focal point;
(c) focusing said light beam from said light source at a sixth focal point within said object to optically change a sixth location within said object at said sixth focal point; and
(d) moving said object relative to said light beam while creating said optical change at said fifth location, wherein the spacing between said fourth location and said fifth location is different than the spacing between said fifth location and said sixth location, while the time elapsed between the creation of said optical change at said fourth location and said optical change at said fifth location is substantially the same as the time elapsed between the creation of said optical change at said fifth location and said optical change at said sixth location while being different than the time elapsed between the creation of said optical change at said first location and said optical change at said second location.

17. A method of modifying the optical properties of an object comprising:
(a) focusing a light beam from a light source at a first focal point within said object to optically change a first location within said object at said first focal point;
(b) focusing said light beam from said light source at a second focal point within said object to optically change a second location within said object at said second focal point, where a first distance is between said first position and said second position, where a first time occurs between optically changing said first location and said second location; and
(c) focusing said light beam from said light source at a third focal point within said object to optically change a third location within said object at said third focal point, and a second distance is between said second position and said third position, where said first distance is different than said second distance, where a second time occurs between optically changing said second location and said third location, and said first time is substantially the same as said second time.

18. The method of claim 17 further comprising moving said object relative to said light beam while creating said optical change at said second location.

19. The method of claim 17 wherein said light source provides said light beam of substantially coherent electromagnetic radiation.

20. The method of claim 19 wherein said light source provides a pulse of light focused at said second focal point.

21. The method of claim 20 wherein said light source is a pulsed laser.

22. The method of claim 17 wherein said object is moved using a stepper motor.

23. The method of claim 17 wherein said object is continuously moved from said first location to said second location to said third location using a stepper motor.

24. The method of claim 17 wherein said light beam does not create visibly perceptible optical changes within said object during the time between the creation of said optical change at said first location and the creation of said optical change at said third location except for the creation of said optical change at said second location.

25. The method of claim 17 wherein a preselected image is created within said object.

26. The method of claim 17 wherein said first time and said second time are equal.

27. The method of claim 17 wherein said light source is a pulsed laser with a substantially constant pulse rate.

28. The method of claim 17 wherein said object is positioned with a positioning stage that is adjusted with non-uniform acceleration between the creation of said first position, said second position, and said third position, when said first, second, and third positions are linearly aligned.

29. The method of claim 17 wherein said object is positioned with a positioning stage that is adjusted with non-uniform speed between the creation of said first position, said second position, and said third position.

30. The method of claim 17 wherein said light source is a laser operating at a thermal equilibrium.

31. The method of claim 17 wherein said light source is a pulsed laser providing substantially constant energy for each pulse.

32. The method of claim 17 further comprising:
(a) focusing said light beam from said light source at a fourth focal point within said object to optically change a fourth location within said object at said first focal point;
(b) focusing said light beam from said light source at a fifth focal point within said object to optically change a fifth location within said object at said fifth focal point;
(c) focusing said light beam from said light source at a sixth focal point within said object to optically change a sixth location within said object at said sixth focal point; and
(d) moving said object relative to said light beam while creating said optical change at said fifth location, wherein the spacing between said fourth location and said fifth location is different than the spacing between said fifth location and said sixth location, while the time elapsed between the creation of said optical change at said fourth location and said optical change at said fifth location is substantially the same as the time elapsed between the creation of said optical change at said fifth location and said optical change at said sixth location while being different than the time elapsed between the creation of said optical change at said first location and said optical change at said second location.

33. A method of modifying the optical properties of an object including a curved surface comprising:
(a) focusing a light beam from a light source at a first focal point within said object to optically change a first location within said object at said first focal point where said light beam is oriented substantially in line with the center of radius of said curved surface of said object;
(b) rotating said object;
(c) focusing said light beam from said light source at a second focal point within said object to optically change a second location within said object at said focal point where said light beam is oriented substantially in line with the center of radius of said curved surface of said object
(d) rotating said spherical object; and
(e) focusing said light beam from said light source at a third focal point within said object to optically change a third location within said object at said third focal point where said light beam is oriented substantially in line with the center of radius of said curved surface of said object.

34. The method of claim 33 wherein said beam is incident upon said curved surface at a substantially normal orientation during the creation of said optical change at said first location, the creation of said optical change at said second location, and the creation of said optical change at said third location.

35. The method of claim 34 wherein an image is etched within said object.

36. The method of claim 34 wherein said curved surface has a radius of curvature of greater than ¾ of an inch.

37. The method of claim 36 wherein said object is substantially spherical.

38. The method of claim 34 wherein said light source is a laser.

39. The method of claim 38 wherein said laser is a pulsed laser.

40. A method of modifying the optical properties of an object comprising:
(a) focusing a first light beam at a first focal point within said object;
(b) focusing a second light beam at a second focal point within said object, where said first light beam and said second light beam are non-collinear;
(c) creating a first interference between said first light beam and said second light beam and optically changing said object in accordance with said first interference in a manner that persists after said first and second light beam no longer are creating said first interference;
(d) focusing said first light beam at a third focal point within said object;
(e) focusing said second light beam at a fourth focal point within said object, where said first light beam and said second light beam are non-collinear; and
(f) creating a second interference between said first light beam and said second light beam and optically changing said object in accordance with said second interference in a manner that persists after said first and second light beam no longer are creating said second interference.

41. The method of claim 40 wherein said object includes material that changes the index of refraction of said object in response to said light beam.

42. The method of claim 40 wherein said material includes silver.

43. The method of claim 41 wherein said first interference results in a first set of substantially parallel lines.

44. The method of claim 43 wherein said second interference results in a second set of substantially parallel lines.

45. The method of claim 40 wherein said first interference between said first light beam and said second light beam occurs at said first focal point.

46. The method of claim 40 wherein said first focal point and said second focal point are overlapping.

47. The method of claim 46 wherein said third focal point and said fourth focal point are overlapping.

48. The method of claim 40 wherein the angle between said first light beam and said second light beam is selected to modify the resulting interference.

49. The method of claim 48 wherein said resulting interference is selected to create a pixel with selected color when illuminated by multi-colored light.

50. The method of claim 49 wherein two pixels are created each of which has a different selected color.

51. The method of claim 46 wherein said first interference and said second interference are overlapping while providing separate pixels.

52. The method of claim 46 further comprising moving said object relative to said first light beam while creating said optical change at said first interference.

53. The method of claim 46 wherein said first light beam is substantially coherent electromagnetic radiation.

54. The method of claim 53 wherein said first light beam is from a pulsed laser.

55. The method of claim 40 wherein said first interference is within said object.

56. The method of claim 40 wherein said first interference is on the exterior of said object.

57. A method of modifying the optical properties of an object comprising:
(a) focusing a light beam from a light source at a first focal point within said object to optically change a first location within said object at said first focal point;

(b) focusing said light beam from said light source at a second focal point within said object to optically change a second location within said object at said second focal point where said optical change at said first location has a different grey shade than said optical change at said second location;

(c) focusing said light beam from said light source at a third focal point within said object to optically change a third location within said object at said third focal point; and (d) moving said object relative to said light beam while creating said optical change at said second location.

58. The method of claim 57 further comprising:

(a) focusing said light beam from said light source at a third focal point within said object to optically change a third location within said object at said third focal point; and (b) moving said object relative to said light beam while creating said optical change at said second location.

59. The method of claim 58 wherein said light source provides said light beam of substantially coherent electromagnetic radiation.

60. The method of claim 59 wherein said light source provides a pulse of light focused at said second focal point.

61. The method of claim 60 wherein said object is continuously moved from said first location to said second location to said third location using a stepper motor.

62. The method of claim 58 wherein said light beam does not create visibly perceptible optical changes within said object during the time between the creation of said optical change at said first location and the creation of said optical change at said third location except for the creation of said optical change at said second location.

63. The method of claim 58 wherein the spacing between said first location and said second location is different than the spacing between said second location and said third location, while the time elapsed between the creation of said optical change at said first location and said optical change at said second location is substantially the same as the time elapsed between the creation of said optical change at said second location and said optical change at said third location.

64. The method of claim 63 wherein the relative times elapsed are equal.

65. The method of claim 63 wherein said light source is a pulsed laser with a substantially constant pulse rate.

66. The method of claim 63 wherein said object is positioned with a positioning stage that is adjusted with non-uniform acceleration between the creation of said first position, said second position, and said third position, when said first, second, and third positions are linearly aligned.

67. The method of claim 63 wherein said object is positioned with a positioning stage that is adjusted with non-uniform speed between the creation of said first position, said second position.

68. The method of claim 67 wherein said light source is a laser operating at a thermal equilibrium.

69. The method of claim 67 wherein said light source is a pulsed laser providing substantially constant energy for each pulse.

70. The method of claim 58 further comprising:

(a) focusing said light beam from said light source at a fourth focal point within said object to optically change a fourth location within said object at said first focal point;

(b) focusing said light beam from said light source at a fifth focal point within said object to optically change a fifth location within said object at said fifth focal point;

(c) focusing said light beam from said light source at a sixth focal point within said object to optically change a sixth location within said object at said sixth focal point; and (d) moving said object relative to said light beam while creating said optical change at said fifth location, wherein the spacing between said fourth location and said fifth location is different than the spacing between said fifth location and said sixth location, while the time elapsed between the creation of said optical change at said fourth location and said optical change at said fifth location is substantially the same as the time elapsed between the creation of said optical change at said fifth location and said optical change at said sixth location while being different than the time elapsed between the creation of said optical change at said first location and said optical change at said second location.

71. A method of modifying the optical properties of an object comprising:

(a) exciting a gain medium and triggering a switching mechanism to provide a pulse of light;

(b) focusing a light from said light source at a first focal point within said object to optically change a first location within said object at said first focal point, wherein said light source includes a gain medium and a switching mechanism;

(c) exciting said gain medium and not triggering said switching mechanism;

(d) exciting said gain medium and triggering said switching mechanism to provide a pulse of light; and (e) focusing a light from said light source at a second focal point within aid object to optically change a second location within said object at said second focal point.

72. The method of claim 71 wherein said light source provides said light of substantially coherent electromagnetic radiation.

73. The method of claim 71 wherein a flash lamp excites said gain medium.

74. The method of claim 71 wherein a diode pump excites said gain medium.

75. The method of claim 71 wherein said switching mechanism includes a Q switch.

\* \* \* \* \*

UNITED STATES PATENT AND TRADEMARK OFFICE
CERTIFICATE OF CORRECTION

PATENT NO. : 6,596,967 B2
DATED : July 22, 2003
INVENTOR(S) : Miesak

It is certified that error appears in the above-identified patent and that said Letters Patent is hereby corrected as shown below:

Title page,
Item [57], ABSTRACT,
Line 9, change "focal point The object" to -- focal point. The object --

Column 1,
Line 17, change "fracture., e.g. a three" to -- fracture, e.g. a three --

Column 4,
Line 43, change "eye ad thus" to -- eye and thus --

Column 11,
Line 44, change "surface of said object" to -- surface of said object; --

Signed and Sealed this

Eighth Day of March, 2005

JON W. DUDAS
*Director of the United States Patent and Trademark Office*